United States Patent [19]

Yokota et al.

[11] 3,746,461
[45] July 17, 1973

[54] DEVICE FOR BALANCING AXIAL THRUST ON THE IMPELLER SHAFT OF PUMPS

[76] Inventors: Hidekuni Yokota, 1428 Asahi-machi; Shingo Yokota, 1627 Midori-machi, both of Hiroshima, Japan

[22] Filed: Oct. 8, 1971

[21] Appl. No.: 187,784

[52] U.S. Cl. ................................................ 415/104
[51] Int. Cl. .............................................. F04f 1/04
[58] Field of Search ............................ 415/104, 107; 277/27

[56] References Cited
UNITED STATES PATENTS

| | | | |
|---|---|---|---|
| 2,221,225 | 11/1940 | Weis et al. | 415/104 |
| 1,927,543 | 9/1933 | Doyle | 277/27 |
| 2,680,410 | 6/1954 | Kolb | 415/104 |
| 3,031,973 | 5/1962 | Kramer | 415/104 |
| 3,085,808 | 4/1963 | Williams | 277/27 |
| 3,225,698 | 12/1965 | Spisiak | 415/104 |
| 3,511,510 | 5/1970 | Lindeboom | 277/27 |
| 1,936,066 | 11/1933 | Peterson | 415/104 |

Primary Examiner—C. J. Husar
Attorney—Holman and Stern

[57] ABSTRACT

For balancing the axial thrust on the shaft of a centrifugal pump, an axially displaceable thrust drum is installed between a high-pressure chamber on the back of the impeller and a low-pressure chamber defined by an enclosure attached to the pump casing. A balancing disk is provided within the enclosure so as to be axially slidable along with the thrust drum, while a pump shaft extends centrally through the thrust drum and balancing disk with a suitable clearance. A thrust disk is firmly mounted on the pump shaft to define a balancing chamber between itself and the balancing disk, the balancing chamber being in communication with both the low-pressure chamber and the high-pressure chamber.

4 Claims, 2 Drawing Figures

DEVICE FOR BALANCING AXIAL THRUST ON THE IMPELLER SHAFT OF PUMPS

BACKGROUND OF THE INVENTION

This invention relates generally to pumps, and more specifically to a device for balancing the axial thrust on the impeller shaft of centrifugal pumps.

A balancing disk and a balacing drum are among the most usual means heretofore employed for balancing the axial thrust on the impeller shaft of multistage pumps. In spite of their professed advantages, the balancing disk and drum have proved to be subject to their own drawbacks or inconveniences in certain applications. The balancing disk, for example, is capable of balancing the axial thrust of a pump through a hydrodynamic procedure, and the gap between the disk and a stationary face of the pump is automatically readjusted when the disk is worn to a certain degree. Leakage losses through the gap is therefore maintained within a prescribed range to make possible an efficient pumping operation for an extended length of time. However, because of certain mechanical features of the balancing disk, the pump shaft cannot be so retained as to be axially immovable, so that considerable axial displacement of the pump shaft results at the time of rapid start-up or stopping of the pump and particularly at the instant of pump stopping caused by an interruption of the electric power supply.

The shaft of a multistage pump incorporating the aforesaid balancing drum, on the other hand, can be made axially immovable. (Or, it may be said that the pump shaft must be axially retained since the balancing drum, by itself, can hardly provide a perfect balance unlike the balancing disk.) It will be apparent that the amount of leakage due to a difference between the liquid pressures on both sides of the balancing drum is dependent upon the width of the gap surrounding the periphery of the drum. As is inevitable from the structure of the drum, howver, this gap is somewhat easily widened by wear. Hence the efficient operation of the balancing drum is susceptible to ready impairment when the pump is used, for instance, for raising water containing appreciable percentages of sand, slime and the like. On the other hand, the combination of the balancing disc and drum does not eliminate substantially their disadvantages.

SUMMARY OF THE INVENTION

In view of the above stated disadvantages of the prior art, the present invention makes it an object to provide a new and better device for balancing the axisl thrust on the impeller shaft of centrifugal pumps.

It is also an object of this invention to provide a balancing device of the character referred to, which combines the advantages of the conventional balancing disk and drum while successfully eliminating only their disadvantages.

Another object of the invention is provide a balancing device of the character referred to, which permits a pump shaft to be previously so retained as to be axially nondisplaceable.

A further object of the invention is to provide a balancing device of the character referred to, in which gap-forming projections of a balancing disk and a thrust disk defining a balancing chamber therebetween are made of sufficiently wera-resisting material resulting in a longer service life of the balancing device.

It is a still further object of this invention to provide a balancing device of the character referred to, in which the balancing chamber communicates with a high pressure chamber on the back of the impeller of a pump not only through a clearance provided between the balancing disk and the pump shaft but through a passage of an auxiliary nature directly extending between the chambers, thereby stabling the amount of liquid flow to the balancing chamber and hence protecting the adjoinging parts forming the clearance against damage.

According to the present invention, briefly summarized, there is provided a device for balancing the axial thrust on the impeller shaft of a centrifugal pump, which balancing device comprises an enclosure formed axially adjacent a high pressure chamber, said enclosure defining therewithin a low-pressure chamber communicating with the suction side of the pump, an axially displaceable thrust drum installed between the high-pressure chamber and the low-pressure chamber, a balancing disk within the enclosure which is greater in cross sectional area than the thrust durm and which is formed substantially integrally with the same so as to be axially displaceable therewith, and a thrust disk firmly mounted on the pump shaft on the side remote from the thrust drum with respect to the balancing disk and arranged in face to face relationship with the balancing disk, the balancing disk and the thrust disk defining therebetween a balancing chamber which is in communication with the high-pressure chamber through the balancing disk and the thrust durm and with the low pressure chamber through a gap between the opposing peripheral edges of the balancing and thrust disks.

The above stated and various other objects, features and advantages of the present invention will become more fully understandable from the following detailed description when taken in connection with the accompanying drawing which illustrates, by way of example, a preferred embodiment of the invention.

DETAILED DESCRIPTION

Figure 1:
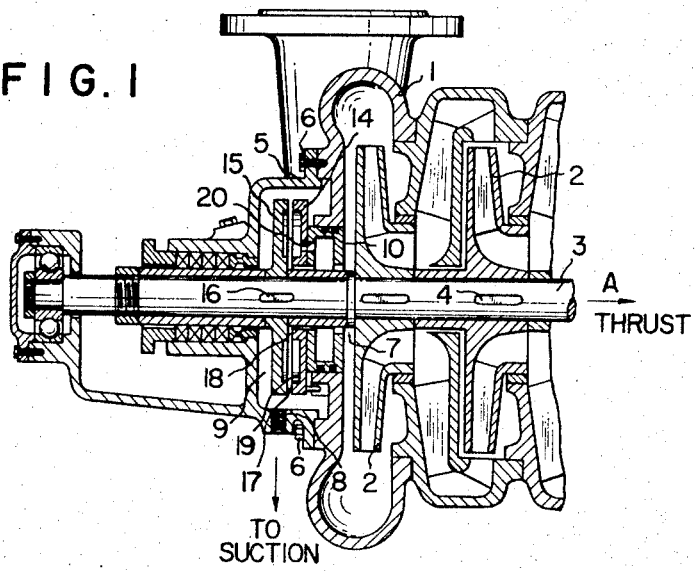
FIG. 1 shows a fragmentary axial sectional view of a multi-stage centrifugal pump incorporating a balancing device constructed in accordance with the concepts of the present invention.
Figure 2:
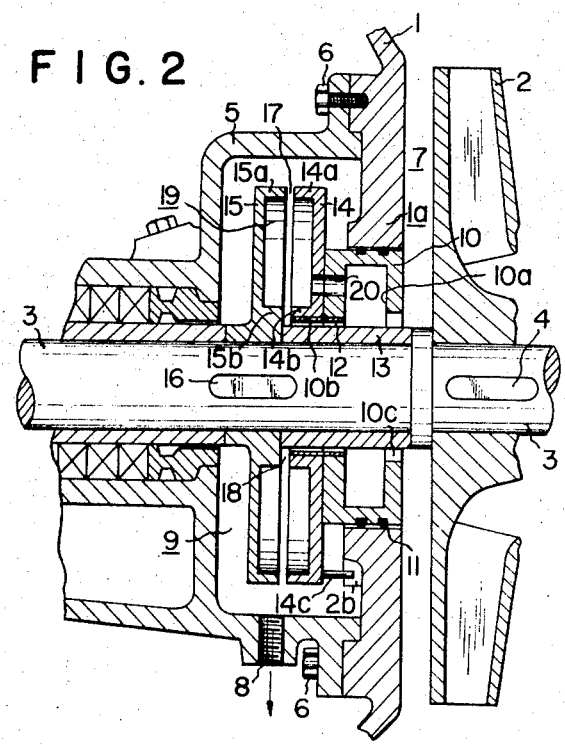
FIG. 2 is an enlarged fragmentary section of part of the pump shown in FIG. 1.

Referring now to FIGS. 1 and 2 in order to first describe the construction of an example of the balancing device of this invention, a casing 1 illustrated therein houses impellers 2 of a multistage centrifugal pump incorporating the teachings of the invention, the impellers 2 being fixedly mounted on a pump shaft 3 by means such as keys 4. An enclosure 5 in which are provided various means for balancing the axial thrust of the pump, as hereinafter described in detail, is secured by bolts 6 on the casing 1 adjacent a high-pressure chamber 7 on the back of the last stage impeller 2. This enclosure 5 is provided with a port 8 that is in communication with the suction side of the pump.

Between the interior chamber 9 of the enclosure 5 and the high-pressure chamber 7, a thrust drum 10 which is nonrotatable like the pump casing 1 and the enclosure 5 is fitted fluid-tightly in an axial bore of a casing portion 2a so as to be only axially slidable relative to the inner surface of the bore. The thrust drum 10 is shown as having an annular groove 10a, but no specific limitations are to be imposed upon the shape or size of this thrust drum 5 except that its cross sectional area is approximately equal to that of the mouth area of the impeller 2 in each pump stage for reasons to be described later in this specification. O-rings 11 may be provided to seal the possible gap between the thrust drum 10 and the surrounding wall of the bore in the casing portion 1a. A suitable annular clearance 12 is formed between the thrust drum 10 and a sleeve 13 on the shaft 3. A wear-resistant layer 10b (FIG. 2) may be provided on the drum 10. This layer functions as a strainer and protects the parts to which it is applied. It will be observed that the thrust drum 10 is substantially not affected by the rotation of the shaft 3 becuase of the provision of a lug 14C engaging a recess 2b in the casing portion 2a.

A balancing disk 14 is rigidly coupled to the thrust drum 10 to be axially displaceable therewith and, on the low pressure side of this balancing disk 14, that is, on the left-hand side of the disk 14 as viewed in FIGS. 1 and 2, a thrust disk 15 is opposingly provided and firmly mounted on the shaft 3 by a key 16. The balancing disk 14 and thrust disk 15 are respectively provided with mutually opposing, substantially annular projections as indicated by numerals 14a, 14b and 15a, 15b ao as to present proper contact surfaces normally having an inner gap 17 and an outer gap 18 therebetween. It is desirable that these annular projections be made of sufficiently wear resisting material.

By the balancing and thrust disks 14 and 15, the space defined by the aforesaid enclosure 5 is divided into a balancing chamber 19 defined between the disks 14 and 15 and the low-pressure chamber 9. It will be apparent from the figures that the low-pressure chamber 9 is communicable with the high-pressure chamber 7 through outer gap 17, balancing chamber 19, inner gap 18 and clearance 12. The high-pressure chamber 7 and the balancing chamber 19 may also be in direct communication with each other through a fluid passage 20 adapted for purposes hereinafter to be described. It is to be understood that provision is made to make the pump shaft 2 axially non-displaceable relative to the pump casing.

Proceeding now to the description of a mode of operation of the above described device for balancing the axial thrust of the multi-stage centrifugal pump, high pressure builds up in the chamber 7 when the pump is set in operation. The high-pressure fluid in the chamber 7 leads to the balancing chamber 19 through an annular space 10c in the drum 10, the clearance 12 and inner gap 18 and through the fluid passage 20 when this is provided. Should the outer gap 17 between the blancing disk 14 and the thrust disk 15 be closed altogether by axial thrust acting on the drum 10, the pressure within the balancing chamber 19 would substantially equal the pressure within the high-pressure chamber 7. However, since the thrust drum 10 is smaller in diameter than the balancing disk 14 as is clear from the drawing, and since the thrust disk 15 is axially immovable as already mentioned, a force corresponding to a difference betwen the rightward force acting on the disk 14 by the pressure in the blancing chamber 19 (in this instance approximating the pressure in the chamber 7) and the leftward forces acting on the drum 10 and the disk 14 by the pressures in the chambers 7 and 9 causes the blancing disk 14 to move to the right as viewed in the figures, thereby opening the aforementioned gap 17.

In the event that the gap 17 opens too wide, the pressure in the balancing chamber 19 drops to the pressure level in the low-pressure chamber 9 so that the thrust durm 10 and therefore the balancing disk 14 are caused to move to the left to suitably narrow the gap 17. Hence, the width of this outer gap 17 stabilizes in a condition determined by the effective cross sectional areas of the gap 18, and, when the passage 20 is provided, by the sum of the cross sectional areas of the passage 20 and the gap 18.

Let us now consider the set force applies to the thrust disk 15 in order to more clearly appreciate the forces working on the thrust drum 10, balancing disk 14 and thrust disk 15 during operation of this balancing device. This net force may be regarded as the difference between the pressures in the chambers 7 and 9 which is applied to the area obtained by subtracting the difference between the effective areas of the blancing disk 14 and the thrust drum 10 from the effective area of the thrust disk 15. That is to say, the net force applied to the thrust disk 15 substantially equals the difference between the pressures of the chambers 7 and 9 which is applied to the area equal to the effective cross sectional area of the thrust drum 10. Therefore, the thrust disk 15 is subject to a leftward force as viewed in the figures. Inasmuch as the cross sectional area of the thrust drum 10 approximates the impeller mouth area in each pump stage as previously mentioned, the above defined net force on the thrust disk 15 substantially equals the axial thrust A applies to the impellers 2. The axial forces on the shaft are therefore balanced.

Even though the opposing surfaces of the annular projections on the balancing disk 14 and the thrust disk 15 may be worn by operation, the inner and outer gaps 18 and 17 therebetween remain substantially constant until the annular projections are worn away, so that the efficient operation of the pump is ensured for extended periods of time. In order trreduce the wear of the projections, they may be made of wear resisting material. The neighborhoods of the gaps 17 and 18 and the clearance 12 are usually susceptible to damage or erosion. The conditions of the inner gap 18 and clearance 12, in particular, are probably most important for the longer service life of the overall balancing device.

In order to reduce the damage or erosion, it is desirable to reduce the amount of liquid flow through the gap 18 and clearance 12. For this purpose, the aforesaid passage 20 is provided which directly communicates the high pressure chamber 7 with the balancing chamber 19. Being in the form of a port, this passage 20 is easily manufacturable so as to resist wear. An additional means (not shown) to bear the stream of liquid therethrough can also be easily provided in the balancing chamber 19. This auxiliary passage 20 not only protects the gap 18 and clearance 12 against damage as aforesaid but greatly improves the operating conditions of the pump shaft 3, shaft sleeve 13 and other important parts of the pump in the adjacency of the clearance 12.

Although the thrust drum 10 and the balancing disk 14 are constructed individually in the illustrated embodiment of the invention, it will be obvious that they can be made in one piece if desired. Further, while the diameter of the balancing disk 14 is subject to no particular limitations, except that it must be greater than that of the thrust drum 10 for the successful operation of the balancing device.

The utility of the present invention is not limited to the illustrated embodiment alone. Consider, for example, a multistage pump in which the several impellers are arranged in two opposing groups (e.g. a high-pressure group and a low-pressure group). In case there is a difference between the numbers of pump stages in the respective groups resulting in a difference between the amounts of axial thrusts produced, by these groups, the balancing device of this invention may be installed intermediate the high- and low-pressure groups to balance such a difference between the axial thrusts caused by the respective groups. The thrust disk 15 in this case may be served by the back plate of the final stage impeller of one of the groups. Alternatively, the thrust disk may be directly coupled to the back plate instead of being mounted on the pump shaft as in the illustraetd embodiment of the invention. Furthermore, it will readily be apparent that the balancing device can be applied to a single-stage pump.

We claim:

1. In a centrifugal pump having a casing providing a high-pressure chamber, and at least one impeller disposed in said chamber and mounted on a pump shaft, a device for balancing axial thrust on the pump shaft comprising an enclosure provided axially adjacent said high-pressure chamber and defining therewithin a low-pressure chamber communicating with the suction side of the pump, an axially displaceable thrust drum provided around said pump shaft between said high-pressure and low-pressure chambers, a balancing disk disposed around said pump shaft within said enclosure and having a cross-sectional area greater than that of said thrust drum, said balancing disk being substantially integral with said thrust drum so as to be axially displaceable therewith, a thrust disk firmly mounted on said pump shaft at the side remote from said thrust drum with respect to said balancing disk and arranged in face to face relationship to the balancing disk, said balancing disk and said thrust disk defining therebetween a balancing chamber which is in communication with said high-pressure chamber through an annular clearance provided between the outer peripheral surface of said pump shaft and an axial bore provided through said thrust drum and said balancing disk and which is in communication with said low-pressure chamber through a clearance between the outer peripheries of said balancing and thrust disks, an annular axial projection integrally provided on the radially inner periphery of said balancing disk and extending toward the opposing face of said thrust disk to define an annular gap between the projection and the thrust drum, said gap communicatively connecting said annular clearance with said balancing chamber, and means providing an axial fluid passage through said thrust drum and said balancing disk, with said passage connecting said high-pressure chamber and said balancing chamber.

2. The device according to claim 1 in which said balancing disk and said thrust disk have respective annular projections provided along the outer peripheral portions thereof and axially extending toward each other.

3. The device according to claim 1, further including a wear resistant layer on the surface of said bore passing through said balancing disk and said thrust drum.

4. The device according to claim 1, in which said thrust drum is of substantially U-shaped cross-section, said thrust drum having therein a radially inwardly opening annular groove which communicates with said high-pressure chamber and said fluid passage.

* * * * *